United States Patent [19]

Yamazoe et al.

[11] 4,234,638
[45] Nov. 18, 1980

[54] COMPOSITE GRAPHITE SHEETS

[75] Inventors: Hiroshi Yamazoe; Isao Sugiura, both of Yokohama, Japan

[73] Assignee: Nippon Carbon Co., Ltd., Tokyo, Japan

[21] Appl. No.: 817,319

[22] Filed: Jul. 20, 1977

[30] Foreign Application Priority Data

Jul. 23, 1976 [JP] Japan .................. 51-87853

[51] Int. Cl.³ .................. B32B 3/10; B32B 3/24; B29J 1/00
[52] U.S. Cl. .................. 428/133; 264/112; 264/273; 264/274; 264/319; 277/235 B; 428/134; 428/138; 428/174; 428/256; 428/408; 428/140
[58] Field of Search .......... 428/256, 156, 408, 421, 428/422, 172, 134, 138, 133, 140; 277/235 B; 423/447.2, 448; 264/273, 274, 112, 319; 106/56

[56] References Cited

U.S. PATENT DOCUMENTS

| | | | |
|---|---|---|---|
| 2,006,381 | 7/1935 | Bailey | 428/133 |
| 2,029,302 | 2/1936 | Balfe | 428/133 |
| 2,930,106 | 3/1960 | Wrotnowski et al. | 428/422 |
| 3,061,656 | 10/1962 | Chappell | 423/447.2 |
| 3,404,061 | 10/1968 | Shane et al. | 428/408 |
| 3,423,496 | 1/1969 | Olstowski | 264/118 |
| 4,042,747 | 8/1977 | Breton et al. | 428/422 |
| 4,075,114 | 2/1978 | Ishikawa et al. | 428/408 |
| 4,146,401 | 3/1979 | Yameda et al. | 423/448 |

*Primary Examiner*—Paul J. Thibodeau
*Attorney, Agent, or Firm*—Jordan and Hamburg

[57] ABSTRACT

Composite sheets comprising expanded graphite, a sheet-like metallic core inserted therein and, if desired, a binder for the expanded graphite. In one embodiment, gaskets are prepared from the composite sheets.

17 Claims, 18 Drawing Figures

COMPOSITE GRAPHITE SHEETS

This invention relates to composite sheets having moderate rigidity and flexibility.

A process for the preparation of flexible graphite sheets by compression molding expanded graphite is known from Japanese Patent Gazette No. 23966/69 (corresponding U.S. Pat. No. 3,404,061). The flexible graphite sheets are produced by compression molding expanded graphite in the absence of a binder. They are characterized by their satisfactory flexibility, impermeability and recovery against compression; however, they are disadvantageous in that because of their brittleness and low rigidity, they are apt to be deformed and broken and difficult to handle. Even graphite sheets obtained by adding a binder to expanded graphite do not have sufficiently improved rigidity.

Particularly in cases where the conventional graphite sheets are used as complicatedly shaped gaskets for cylinder heads and exhaust manifolds of automobiles or used as gaskets for use at high pressures and temperatures for large-scale apparatuses, they are disadvantageous in that they are difficult to cut and punch and apt to be deformed and broken during operations of fitting them in position whereby they do not provide perfect sealability or sealing performance.

It has been found by the present inventors that the use of metallic cores in sheet form as reinforcing material in the preparation of graphite sheets will result in the production of composite sheets having remarkably improved rigidity and excellent chemical resistance. The composite sheets are those which consist of expanded graphite or binder-containing expanded graphite and in which the metallic cores are included as the reinforcing material.

The composite sheets of this invention may have remarkably improved rigidity without impairing the flexibility, impermeability, heat resistance, corrosion resistance and the like of the expanded graphite material or binder-containing graphite material included in the composite sheets since they contain the sheet-like metallic cores as the reinforcing material. Further, as their characteristics they have excellent recovery against compression and are little deformable, little breakable, easy to handle, and easily moldable into various desired shapes. Because of their characteristics, they are very suitable for use as packing and gasket materials for automobiles, chemical apparatuses, apparatuses for atomic reactors, and other industrial apparatuses and are also very suitable for use as lining material for containers and as gaskets usable at high temperatures and pressures.

The expanded graphite used herein may be obtained by treating natural graphite, pyrolytic graphite, Kish graphite or the like in powder form with conc. sulfuric acid, conc. nitric acid, sodium nitrate, potassium permanganate, an oxidizing mixture of sulfuric and nitric acids as well as bromine, a halogenide or the like, to produce a modified graphite particles having interlayer or lamellar compounds formed therein followed by rapidly heating the thus produced modified graphite particles to, for example, not lower than 1000° C. for 1-10 seconds to create a gas pressure in the modified graphite particles thereby enlarging the interlayer spaces therein. Assuming that the direction perpendicular to the layer planes of the graphite is referred to as "c direction" in this case, the expanded graphite particles used herein have c direction expansions about 10 to about 300 times the c direction dimension of the original graphite particles. Thus, there may be obtained expanded graphite particles of any desired expansion by selecting said treating and heating conditions.

The expansion of not more than ten times will result in the production of expanded graphite which is unsatisfactory in self-adhesiveness, mechanical strength and the like.

The binders used herein are employed to improve the expanded graphite in mechanical strength, corrosion resistance and the like, and they may preferably be inorganic and synthetic resin binders having excellent heat resistance and corrosion resistance.

The binders may be incorporated in and mixed with the expanded graphite to form a mixture which is then compression molded into sheet-like moldings. The moldings so obtained may be heat treated to effect a better bond. The amount of the binder used depends on the kind thereof and is in the range of about 0.1 to 50% by weight of the mixture of the expanded graphite and binder.

The binders used herein include inorganic binders such as oxidized graphite (3 to 40 wt.% used), boric acid (3 to 15 wt.% used) and aluminum phosphates (0.1 to 30 wt.% used) as well as organic binders such as fluorine resins (1 to 50 wt.% used).

The oxidized graphite, which is also called graphitic acid, used herein as a binder may illustratively be prepared by mixing natural graphite particles with conc. sulfuric acid and nitric acid to form a mixture which is maintained at not higher than 0° C., incorporated in small portions with potassium chlorate and then water washed.

It is difficult to produce oxidized graphite of a predetermined composition, and the composition of oxidized graphite to be produced will widely vary depending upon conditions under which the oxidized graphite is produced. The oxidized graphite contains carbon and oxygen in a C/O ratio of about 2.4– about 3.5 and further contains some hydrogen. In the oxidized graphite, the oxygen and hydrogen are present in the form of =O, —OH and —COOH groups which are securely coordination bonded to the plane of comdensed ring of the carbon. The oxidized graphite may easily be gelled and finally converted to a colloidal solution. The oxidized graphite may be uniformly dispersed in expanded graphite by adding the former in the form of a colloidal solution to the latter.

As compared with expanded graphite only, oxidized graphite-containing expanded graphite will result in the production of composite sheets with a graphite having high density, excellent mechanical strength, few cracks and peeling, low air-impermeability and satisfactory flexibility when subjected to the same molding pressure. The content of the oxidized graphite in the composite sheet may preferably be in the range of 3-40 wt.% based on the weight thereof. The content of the oxidized graphite of less than 3 wt.% will not result in improving the composite sheet in strength, while the content of more than 40 wt.% will not result in the remarkable improvement of the resulting composite sheet in strength with the gasket coefficient being increased.

In this invention, boric acid is used in the form of powder or a solution in methanol, ethanol, acetone, water or other solvents. The content of boric acid in the composite sheet may preferably be in the range of 3-15 wt.%. The content of less than 3 wt.% will be not remarkably effective, while the content of more than 15 wt.% will result in impairing the flexibility of the resulting sheet.

Boric acid may be added to expanded graphite to form a mixture which is then compression molded into a desired shape under a pressure of 80–250 kg/cm$^2$. The molding may preferably be effected by the use of a hot press and it may preferably be carried out at 600° C. or higher. Boric acid in expanded graphite will activate the graphite particles to securely bond the particles to each other and, in addition, the heating of a mixture of the boric acid and expanded graphite will partly produce boron carbide to effect a securer bond between the particles, thereby easily obtaining composite sheets with a graphite layer having flexibility and high density as well as excellent impermeability, heat resistance and corrosion resistance.

Aluminium phosphates used herein include the following:

(a) $Al_2O_3.3P_2O_5.6H_2O$ (aluminum primary phosphate)
(b) $Al_2O_3.0.25Cr_2O_3.3P_2O_5. nH_2O$ (chromium aluminum primary phosphate)
(c) $Al_2O_3.xR(OH)NH_2.3P_2O_5. yH_2O$ (aluminum primary phosphate in neutralized form)
(d) $Al_2(OH)_5Cl.2.4H_2O$ (basic aluminum chloride)
(e) amorphous basic aluminum compound (Chemical formula is uncertain.)

The compounds (a)–(d) are used as binders, and those (d)–(e) as curing agents. The compounds of aluminum primary phosphate family are used as binders capable of effecting a secure bond and they will improve expanded graphite in fire-proofing, corrosion resistance, spalling resistance and, particularly, oxidation resistance without a decrease in strength at high temperatures if they are added as the binder to the expanded graphite. The amount of the aluminum phosphates added to expanded graphite may be in the range of preferably 0.1–30 wt.%, more preferably 5–20 wt.%. The use of less than 0.1 wt.% of the phosphates in expanded graphite will not improve the graphite in mechanical strength, while the use of more than 30 wt.% will degrade the graphite in flexibility.

The aluminum phosphates may be added in powder or solution form to expanded graphite to form a blend which is mixed and then compression molded into a desired shaped body. The curing time for such shaped bodies may vary depending on the amount of a binder used and the kind and amount of a curing agent used; on the other hand, the shaped bodies may be heat treated to promote the polycondensation thereof thereby effecting a secure bond between the graphite particles in the shaped bodies. The temperature for the heat treatment may preferably be 500° C. or higher. The shaped bodies in which a chromium-containing aluminum phosphate is used have excellent self-curability and, therefore, they may be cured even at a temperature of as low as about 100° C.

Fluorine resins which may be used herein, include polytetrafluoroethylene, polychlorotrifluoroethylene and tetrafluoroethylene-hexafluoropropylene copolymers. They may be selectively used depending on properties required in the final products.

The use of fluorine resins as a binder in expanded graphite will permit the graphite to be molded at a relatively low pressure and result in the production of a composite sheet including a flexible graphite layer having low friction coefficient, low gasket coefficient and excellent chemical resistance.

The sheet-like metallic cores used herein include nets made of iron, copper, nickel, aluminum and alloys thereof such as stainless steel, brass and phosphor bronze and also include metallic sheets having many perforations therein such as hooked metallic sheets.

For a description of the composite sheets of the present invention, reference is made to the accompanying drawings in which.

Figure 10:
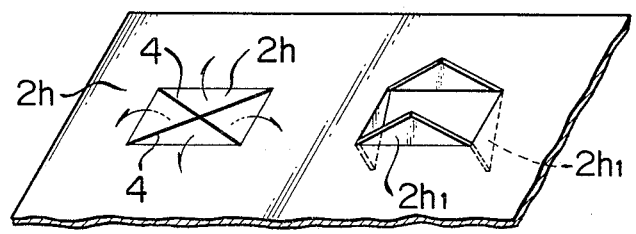
Figure 11:
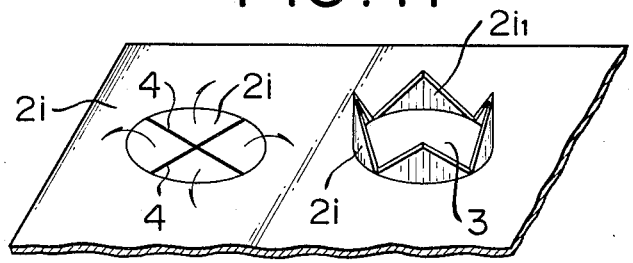
Figure 12:
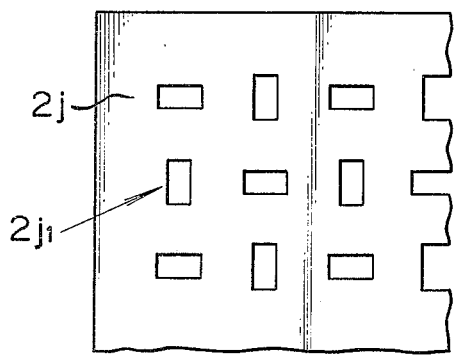
Figure 13:
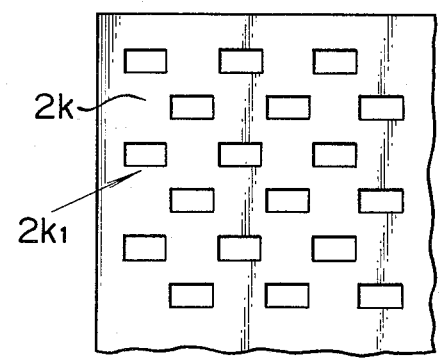

FIGS. 10 and 11 each show on the left hand side thereof the same cutting lines along which a metallic sheet is cut and treated to form other modifications of hooks and the right hand side of each Figure shows the modified hooks;

FIG. 12 shows a manner of distribution of such hooks as in FIGS. 6B, 7B, 8B, 9, 10 and 11; and FIG. 13 shows another manner of distribution of such hooks as in FIG. 12.

The suitable selection of wire diameter size and mesh size of the net as the reinforcing core will result in the production of composite sheets having moderate rigidity and flexibility. Preferable wire diameter size is in the range of 0.01–10.5 mm and preferable mesh size in the range of 0.02–1 mm. The wire nets used herein include twilled ones, plain-woven ones and any other woven ones as well as metallic wires simply arranged and bonded to each other in the form of a grating.

The hooked metallic sheets as shown in the figures may be prepared by cutting through a metallic sheet (preferably 0.01–1 mm thick, more preferably 0.05 to 0.5 mm thick) in predetermined portions of the sheet and bending upward or downward the cut portions to form hooks (preferably 0.1–2 mm high) of any desired shape such as triangular, rectangular or round shape, leaving perforations at which the cut portions were present on the sheet before being bent, as shown in FIGS. 6 to 11. The ratio between the total area of the perforations and the area of the original sheet surface is in the range of 1–50%, preferably 5–30%.

The sheet-like metallic cores may be degreased or roughened on the surface and then coated thinly with an epoxy or furan resin on the thus degreased or roughened surface. They are inserted in expanded graphite or binder-containing expanded graphite and the whole is then compression molded into composite sheets as shown in FIGS. 1A, 2A, 3, 4, 5, 6A and 7A.

In the figures, numeral 1 indicates expanded graphite or binder-containing expanded graphite, $2-2k$ sheet-like metallic cores, $2d_1-2h_1$ hooks, 3 perforations, 4 cut lines and $2j_1-2k_1$ a combination of hooks and perforation.

The composite sheets of this invention may be prepared by inserting a sheet-like metallic core either in expanded graphite or binder-containing expanded graphite or between sheets thereof and then compression molding or rolling the whole at ambient or elevated temperatures under a pressure of 50–200 kg/cm². This is facilitated since the expanded graphite itself or binder-containing expanded graphite is self-adhesive. If necessary, the sheet-like metallic cores may be coated with, for example, an epoxy or phenol resin binder. The perforations of the sheet-like metallic cores will be filled up with the expanded graphite or binder-containing expanded graphite during the compression or roll molding.

In molding the expanded graphite or binder-containing expanded graphite with the sheet-like metallic core inserted therein or in binding the resulting composite sheet when in use, the hooks of the metallic core are pushed toward the surface of the core to render the tips of the hooks deformed into a key-like shape thereby effecting a securer bond between the graphite or binder-containing graphite and the metallic core and simultaneously improving the composite sheet in dynamic stability (as defined before) due to the elasticity of the deformed hooks. The perforation ratio (ratio of the total area of the perforations of the hooked metallic core to the surface area of the original metallic core) of less than 1% in the metallic core will not result in effecting a fully satisfactory bond between the graphite or binder-containing graphite and the metallic core in the composite sheet, while the perforation ratio of higher than 50% will not result in obtaining fully satisfactory rigidity in the hooked metallic core whereby the composite sheet tends to be broken during its use and is difficult to punch.

The kind of metal and the thickness of the sheet-like metallic cores as well as the shape and size of the perforations and hooks thereof are determined depending on the purpose for which the metal cores are used. The perforation ratio and the number of the metallic cores are also determined depending on the purpose for which they are used.

Conventional sheets made solely of expanded graphite are disadvantageous in that they will be apt to crack if they are at least one millimeter thick, while the use of at least one such metallic core in composite sheets makes it possible to obtain large-sized composite sheets which will not crack if they are 1 to several (about 6) mm thick.

The sheet-like metallic core and the expanded graphite or binder-containing expanded graphite should be contained in a ratio by volume of from 1:99 to 50:50 in the composite sheet whereby the sheet has improved rigidity without imparing its flexibility.

This invention will be better understood by the following non-limitative examples wherein all parts are by weight unless otherwise specified.

EXAMPLE 1

One hundred parts of natural graphite particles (80% of the particles being in the range of particle size from 24 mesh to 48 mesh) were immersed for reaction in a mixed solution of 840 parts of conc. sulfuric acid and 50 parts of sodium nitrate for a period of time of 16 hours. The natural graphite particles so acid-treated were thoroughly washed with water and dried at about 100° C., after which the thus dried particles was heated rapidly to 1300° C. for 10 seconds thereby to obtain expanded graphite particles having c direction expansions about 300 times the c direction dimension of the original graphite particles.

Each of the following various wire nets (1)–(5) was inserted into the expanded graphite particles and the whole was then rolled to be molded into a composite sheet of this invention. The properties of the composite sheets so obtained are shown in Table 1.

| Specification of Wire Nets Used | | |
| --- | --- | --- |
| | Wire diameter(mm) | Mesh size(mm) |
| (1) Stainless steel wire net | 0.30 | 0.84 |
| (2) Stainless steel wire net | 0.18 | 0.42 |
| (3) Stainless steel wire net | 0.11 | 0.25 |
| (4) Stainless steel wire net | 0.11 | 0.18 |
| (5) Stainless steel wire net | 0.11 | 0.30 |

EXAMPLE 2

Figure 1A:
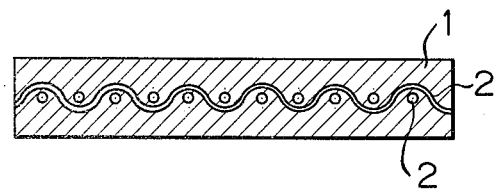
FIG. 1A is a cross-sectional view of a composite sheet embodying this invention in which a net of plain weave is used as the reinforcing core.
Figure 1B:
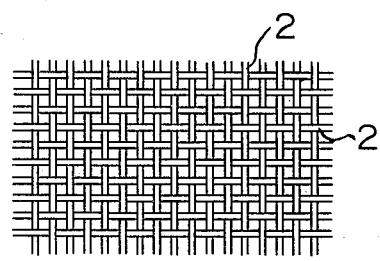
FIG. 1B is a plan of the net of FIG. 1A.
Figure 2A:
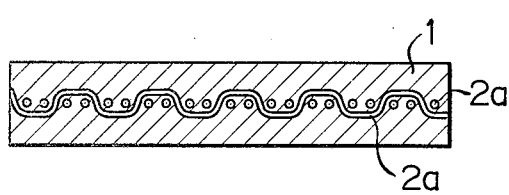
FIG. 2A is a cross-sectional view of another embodiment of a composite sheet in which a twilled metallic net is used as the reinforcing core.
Figure 2B:
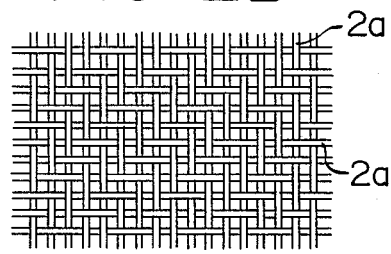
FIG. 2B is a plan of the twilled metallic net of FIG. 2A.
Figure 3:
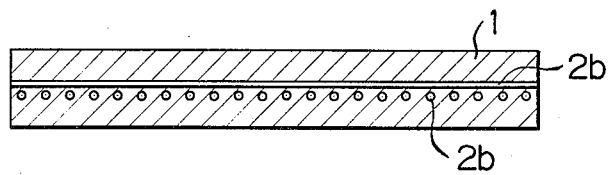
FIG. 3 is a cross-sectional view of still another embodiment of a composite sheet in which is used wires simply arranged and bonded to one another in the form of a grating.
Figure 4:
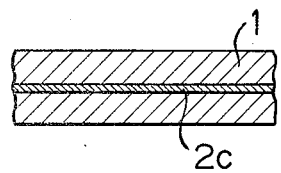
FIG. 4 is a cross-sectional view of a further embodiment of a composite sheet in which a flat iron sheet is used as the reinforcing core.
Figure 5:
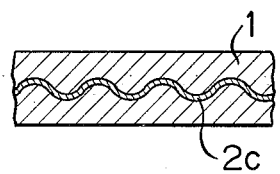
FIG. 5 is a cross-sectional view of a further embodiment of a composite sheet in which an embossed iron sheet is used as the reinforcing core.

The procedure of Example 1 was followed except that the expanded graphite was incorporated with each of oxidized graphite, boric acid, aluminum primary phosphate and polytetrafluoroethylene as binders in the ratios shown in Table 1, to obtain composite sheets of this invention as shown in FIG. 1A. The properties of the composite sheets so obtained are indicated in Table 1.

COMPARATIVE EXAMPLE

The procedure of Example 1 was followed except that the wire net was not used, to obtain an 0.3 mm thick expanded graphite sheet the properties of which are shown in Table 1.

EXAMPLE 3

Figure 6A:
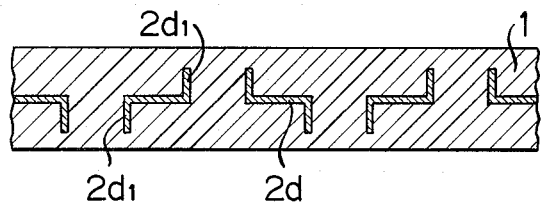
FIG. 6A is a cross-sectional view of a still further embodiment of a composite sheet in which is used as the reinforcing core a metallic sheet so worked as to form rectangular hooks thereof.
Figure 6B:
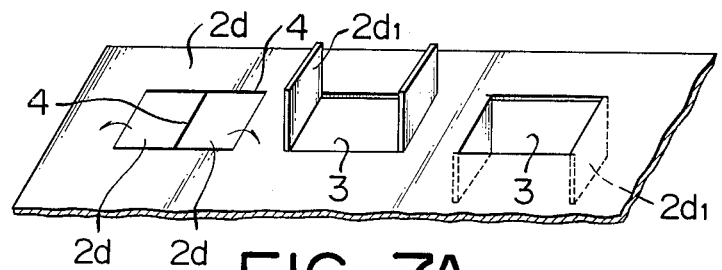
FIG. 6B is a perspective view of the metallic sheet of FIG. 6A being worked prior to use in the preparation of composite sheet of FIG. 6A.
Figure 7A:
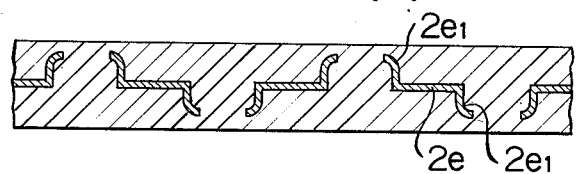
FIG. 7A is a cross-sectional view of a composite sheet in which is used a modification of the metallic sheet of FIG. 6A.
Figure 7B:
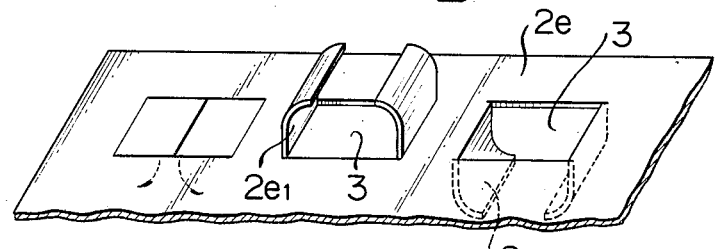
FIG. 7B is a perspective view of the net of FIG. 7A prior to use in the preparation of the composite sheet of FIG. 7A.
Figure 8A:
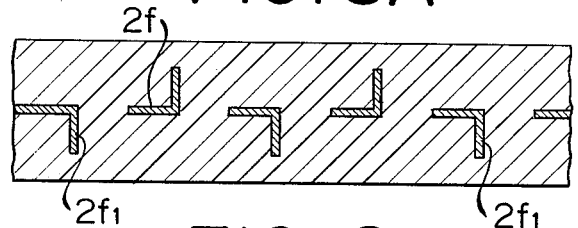
FIG. 8A is a cross-sectional view of a composite sheet in which is used another modification of the metallic sheet of FIG. 6A.
Figure 8B:
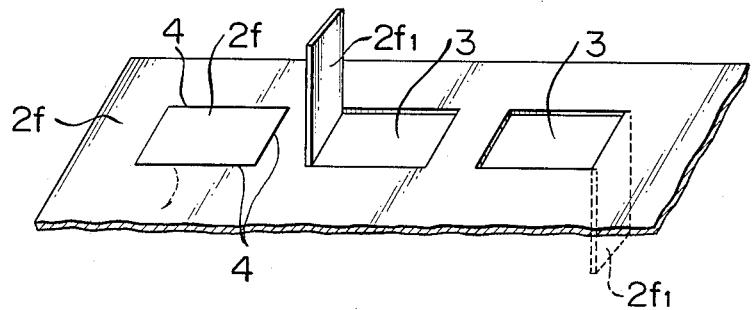
FIG. 8B is a perspective view of the metallic sheet of FIG. 8A being worked prior to use in the preparation of the composite sheet of FIG. 8A.

The same expanded graphite as obtained in Example 1 was molded into sheets, each 0.8 mm thick. A hooked metallic core of the following specification was sandwiched in between the expanded graphite sheets so molded, and the whole was rolled and compression molded to obtain a 1.4 mm thick composite sheet as shown in FIG. 6A. The composite sheet so obtained was punched to obtain therefrom gaskets having the properties shown in Table 2.

Figure 9:
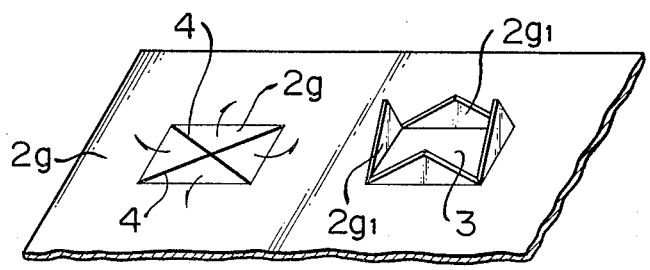
FIG. 9 shows cutting lines on the left hand side thereof along which a metallic sheet is cut and treated to form hooks and the right hand side shows the hooks so formed.

| | Specification of hooked metallic core | | | | |
|---|---|---|---|---|---|
| Material | Thickness (mm) | Size of perforation (mm, rectangular) | Perforation ratio (%) | Shape of hook | Arrangement |
| Stainless steel (SUS 304) | 0.2 | 1.5 × 1.0 | 20 | As shown in FIG. 9 | As shown in FIG. 12 |

TABLE 1

| | | | | Properties | | |
|---|---|---|---|---|---|---|
| | Binder | Wire net (No.) | Total Thickness of composite sheet or sheet (mm) | Bulk specific gravity | Gasket factor | Tensile strength (kg/cm²) |
| Example 1 - 1 | None | (1) | 0.65 | 1.97 | 1.9 | 270 |
| 1 - 2 | " | (2) | 0.35 | 2.77 | 1.9 | 290 |
| 1 - 3 | " | (3) | 0.30 | 2.55 | 2.0 | 260 |
| 1 - 4 | " | (4) | 0.35 | 2.89 | 2.0 | 230 |
| 1 - 5 | " | (5) | 0.30 | 1.95 | 2.0 | 200 |
| Example 2 - 1 | Oxidized graphite 15 wt. % | (1) | 0.65 | 1.95 | 1.7 | 275 |
| 2 - 2 | " | (2) | 0.35 | 2.74 | 1.7 | 297 |
| 2 - 3 | " | (3) | 0.30 | 2.53 | 1.8 | 270 |
| 2 - 4 | " | (4) | 0.35 | 2.86 | 1.8 | 240 |
| 2 - 5 | " | (5) | 0.30 | 1.92 | 1.8 | 220 |
| 2 - 6 | Boric acid 7 wt. % | (2) | 0.35 | 2.78 | 2.0 | 295 |
| 2 - 7 | Aluminum primary phosphate 15 wt. % | (2) | 0.35 | 2.93 | 1.9 | 286 |
| 2 - 8 | Polytetrafluoroethylene 40 wt. % | (2) | 0.35 | 2.98 | 2.0 | 310 |
| Comparative example | None | None | 0.30 | 1.00 | 2.0 | 70 |

EXAMPLE 4

The same expanded graphite as obtained in Example 1 was incorporated with each of oxidized graphite, boric acid, aluminum primary phosphate and polytetrafluoroethylene to form a blend which was mixed, dried and then molded into 0.8 mm thick sheets. The procedure of Example 3 was followed except that each of the said binder-containing expanded graphite was substituted for the binder-free expanded graphite and heating treatment was effected after rolling and compression molding, thereby to obtain 1.4 mm thick composite sheets of this invention as shown in FIG. 6A. The composite sheets so obtained were punched to obtain therefrom gaskets the properties of which are indicated in Table 2.

The gaskets containing the boric acid or the aluminum primary phosphate was found to be useful as gaskets usable at high temperatures and pressures, particularly as those for automobile engines since they wore very little by oxidation even when placed in an oxidizing atmosphere at 500° C. or higher.

In Table 2, compression ratio and restoration ratio were determined in accordance with JIS (Japanese Industrial Standard) R 3453 (1969), and they are expressed respectively by the following formulae:

$$\text{Compressibility (\%)} = \frac{T_0 - T_1}{T_0} \times 100 \text{ and}$$

$$\text{Recovery (\%)} = \frac{T_2 - T_1}{T_0 - T_1} \times 100$$

wherein $T_0$ indicates the thickness of the composite sheet when a preliminary pressure of 7 kg/cm² is applied thereto, $T_1$ the thickness of the composite sheet when a main pressure of 350 kg/cm² is applied thereto, and $T_2$ the thickness of the composite sheet when the main pressure is relieved and substituted by the preliminary pressure.

TABLE 2

| | | | Properties of composite sheet | | | Properties of composite sheets after heat test at 800° C. for three hours in the atmosphere | | | | | |
|---|---|---|---|---|---|---|---|---|---|---|---|
| Ex. | Binder | Molding temp. (°C.) | Gasket factor | Compressibility (%) | Recovery (%) | Gasket factor | Compressibility (%) | Recovery (%) | Ratio of decrease in weight | Ratio of change in size (particularly thickness) | Appearance |
| Ex. 3 | None | Ambient temp. | 2.0 | 30 | 20 | 2.4 | 25 | 15 | 4.0 | −4 | Expanded graphite layer oxidized and surface thereof made porous. |
| Ex. 4-1 | Oxidized graphite 10 wt. % | Ambient temp. | 1.8 | 23 | 27 | 1.8 | 22 | 25 | 1.0 | −2 | Surface somewhat oxidized |
| Ex. | | | | | | | | | | | |

TABLE 2-continued

| | | | Properties of composite sheet | | | Properties of composite sheets after heat test at 800° C. for three hours in the atmosphere | | | | | |
|---|---|---|---|---|---|---|---|---|---|---|---|
| Ex. | Binder | Molding temp. (°C.) | Gasket factor | Compressibility (%) | Recovery (%) | Gasket factor | Compressibility (%) | Recovery (%) | Ratio of decrease in weight | Ratio of change in size (particularly thickness) | Appearance |
| 4-2 | Boric acid 7 wt. % | 500° C., 30 min. | 1.7 | 22 | 35 | 1.8 | 21 | 37 | 0.2 | 0 | No change |
| Ex. 4-3 | Aluminum primary phosphate 15 wt. % | 500° C., 30 min. | 1.7 | 24 | 39 | 1.8 | 22 | 40 | 0.1 | 0 | " |
| Ex. 4-4 | Polytetrafluoroethylene 40 wt. % | 360° C., 1 hr | 1.7 | 45 | 32 | — | — | — | — | — | — |

What is claimed is:

1. A composite sheet for gaskets, prepared by the steps of mixing expanded graphite having a c direction expansion of 10-300 times the c direction dimension of the original graphite particles with an inorganic binder selected from the group consisting of $Al_2O_3.3P_2O_5.6H_2O$, and $Al_2O_3.0.25Cr_2O_3.3P_2O_5.nH_2O$, each in an amount of 0.1 to 30 wt.%, inserting a hooked metallic sheet into said mixture as a core, said metallic sheet having a plurality of protrusions extending from the general plane of the metallic sheet, and compression molding the mixture at a pressure of 50-200 kg/cm² and a temperature of at least 500° C. to form a composite gasket sheet in which the metallic sheet is embedded within the gasket sheet and secured by said protrusions.

2. A composite sheet for gaskets according to claim 1 wherein the ratio between the total area of the perforations of the hooked metallic sheet and the area of the original sheet surface is in the range of 1-50%.

3. A composite sheet for gaskets according to claim 1 wherein said metallic sheet has perforations formed by said cut portions having been bent away from the general plane of the metallic sheet, said molded mixture of expanded graphite and inorganic binder being disposed in said perforations.

4. A composite sheet for gaskets according to claim 3 wherein said protrusions have hooked terminating ends.

5. A composite sheet for gaskets according to claim 3 wherein said protrusions extend from both sides of said metallic sheet.

6. A composite sheet for gaskets according to claim 3 wherein said protrusions have a generally rectangular configuration.

7. A composite sheet for gaskets according to claim 3 wherein said protrusions have a generally triangular configuration.

8. A composite sheet for gaskets, prepared by the steps of mixing expanded graphite having a c direction expansion of 10-300 times the c direction dimension of the original graphite particles with oxidized graphite as a binder in an amount of 3-40 wt.%, inserting a hooked metallic sheet into said mixture as a core, said metallic sheet having a plurality of protrusions extending from the general plane of the metallic sheet, and compression molding the mixture at a pressure of 50-200 kg/cm² and a temperature of at least 500° C. to form a composite gasket sheet in which the metallic sheet is embedded within the gasket sheet and secured by said protrusions.

9. A composite sheet for gaskets according to claim 8, wherein the ratio between the total area of the perforations of the hooked metallic sheet and the area of the original sheet surface is in the range of 1-50%.

10. A composite sheet for gaskets according to claim 8 wherein said metallic sheet has perforations formed by said cut portions having been bent away from the general plane of the metallic sheet, said molded mixture of expanded graphite and inorganic binder being disposed in said perforations.

11. A composite sheet for gaskets according to claim 10 wherein said protrusions have hooked terminating ends.

12. A composite sheet for gaskets according to claim 10 wherein said protrusions extend from both sides of said metallic sheet.

13. A composite sheet fo gaskets according to claim 10 wherein said protrusions have a generally rectangular configuration.

14. A composite sheet for gaskets according to claim 10 wherein said protrusions have a generally triangular configuration.

15. A method of making a composite gasket sheet comprising the steps of mixing expanded graphite having a c direction expansion of 10-300 times the c direction dimension of the original graphite particles with oxidized graphite as a binder in an amount of 3 to 40 wt.%, inserting a hooked metallic sheet into said mixture as a core, said metallic sheet having a plurality of protrusions extending from the general plane of the metallic sheet, and compression molding the mixture at a pressure of 500-200 kg/cm² and a temperature of at least 500° C. to form a composite gasket sheet in which the metallic sheet is embedded within the gasket sheet and secured by said protrusions.

16. A method of making a composite gasket sheet comprising the steps of mixing expanded graphite having a c direction expansion of 10-300 times the c direction dimension of the original graphite particles with an inorganic binder selected from the group consisting of $Al_2O_3.3P_2O_5.6H_2O$ and $Al_2O_3.0.25Cr_2O_3.3P_2O_5.nH_2O$, each in an amount of 0.1 to 30 wt.%, inserting a hooked metallic sheet into said mixture as a core, said metallic sheet having a plurality of protrusions extending from the general plane of the metallic sheet, and compression molding the mixture at pressure of 50-200 kg/cm² and a temperture of at least 500° C. to form a composite gasket sheet in which the metallic sheet is embedded within the gasket sheet and secured by said protrusions.

17. A method according to claim 16 wherein said metallic sheet is formed by bending cut portions of the metallic sheet away from the general plane of the metallic sheet such that the bent cut portions protrude and extend from the general plane of the metallic sheet, said compression molding step comprising compression molding the mixture into the perforations in the metallic sheet formed after said cut portions have been bent away from the general plane of the metallic sheet.

* * * * *